United States Patent
Kim et al.

(10) Patent No.: US 9,091,876 B2
(45) Date of Patent: Jul. 28, 2015

(54) TIME-DIVISION LIQUID CRYSTAL BARRIER AND STEREOSCOPIC IMAGE DISPLAY DEVICE HAVING THE SAME

(75) Inventors: Beom-Shik Kim, Yongin (KR); Hui Nam, Yongin (KR); Jun-Il Kwon, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 401 days.

(21) Appl. No.: 13/597,674

(22) Filed: Aug. 29, 2012

(65) Prior Publication Data

US 2013/0257855 A1    Oct. 3, 2013

(30) Foreign Application Priority Data

Apr. 3, 2012  (KR) .................. 10-2012-0034636

(51) Int. Cl.
| | |
|---|---|
| *G06T 19/00* | (2011.01) |
| *G02F 1/1335* | (2006.01) |
| *G02F 1/1343* | (2006.01) |
| *H04N 13/04* | (2006.01) |

(52) U.S. Cl.
CPC ............ *G02F 1/1335* (2013.01); *G02F 1/1343* (2013.01); *G02F 1/134309* (2013.01); *H04N 13/0413* (2013.01)

(58) Field of Classification Search
CPC ......... G06T 19/00; G06T 17/00; G06T 17/20; H04N 13/00–13/007; H04N 13/0275–13/0278; H04N 2213/001–2113/008
USPC .......................................... 345/419, 690, 87
See application file for complete search history.

(56) References Cited

U.S. PATENT DOCUMENTS

| | | | |
|---|---|---|---|
| 7,612,833 B2 | 11/2009 | Kim | |
| 7,787,064 B2 | 8/2010 | Kwon et al. | |
| 8,045,070 B2 * | 10/2011 | Park et al. | ........................ 349/15 |
| 2009/0002267 A1 * | 1/2009 | Nam et al. | ......................... 345/6 |
| 2009/0224646 A1 * | 9/2009 | Kim et al. | ....................... 313/245 |
| 2012/0062561 A1 * | 3/2012 | Koyama | ..................... 345/419 |
| 2012/0140142 A1 * | 6/2012 | Lee et al. | .......................... 349/61 |
| 2012/0236043 A1 * | 9/2012 | Jung et al. | ..................... 345/690 |
| 2012/0300042 A1 * | 11/2012 | Yun et al. | ......................... 348/51 |
| 2013/0057539 A1 * | 3/2013 | Kim | .............................. 345/419 |

FOREIGN PATENT DOCUMENTS

| | | |
|---|---|---|
| KR | 10-2006-0078051 A | 7/2006 |
| KR | 10-2009-0107158 A | 10/2009 |
| KR | 10-2011-0068596 A | 6/2011 |

* cited by examiner

*Primary Examiner* — Kimbinh T Nguyen
(74) *Attorney, Agent, or Firm* — Lee & Morse, P.C.

(57) ABSTRACT

A time-division liquid crystal barrier includes an upper substrate having first electrodes, second electrodes, and a first insulation layer between the first and second electrodes, the first electrodes being arranged with a first gap, and the second electrodes being arranged with a second gap, a lower substrate having third electrodes, fourth electrodes, and a second insulation layer between the third and fourth electrodes, the third electrodes being arranged with the first gap, and the fourth electrodes being arranged with the second gap, and a liquid crystal layer between the upper substrate and the lower substrate, the first and second electrodes being alternately arranged with respect to the first insulation layer, the third and fourth electrodes being alternately arranged with respect to the second insulation layer, the first electrodes overlap the third electrodes, and the second electrodes overlap the fourth electrodes.

20 Claims, 11 Drawing Sheets

TIME-DIVISION LIQUID CRYSTAL BARRIER AND STEREOSCOPIC IMAGE DISPLAY DEVICE HAVING THE SAME

CROSS-REFERENCE TO RELATED APPLICATION(S)

This application claims priority under 35 USC §119 to Korean Patent Applications No. 10-2012-0034636, filed on Apr. 3, 2012, in the Korean Intellectual Property Office (KIPO), the contents of which are incorporated herein in its entirety by reference.

BACKGROUND

1. Technical Field

Example embodiments relate generally to a stereoscopic image display device employing a parallax barrier method. More particularly, embodiments of the inventive concept relate to a time-division liquid crystal barrier, and a stereoscopic image display device having the same.

2. Description of the Related Art

According to a stereoscopic image display technique, a stereoscopic image, i.e., a three dimensional (3D) image, may be implemented by alternately providing different images, i.e., a left image and a right image, to a left eye and a right eye, respectively. Generally, stereoscopic image display devices may be classified into glasses-type stereoscopic image display devices and non-glasses-type stereoscopic image display devices. Recently, the non-glasses-type stereoscopic image display devices have been developed because the non-glasses-type stereoscopic image display devices are more convenient to a viewer as compared to the glasses-type stereoscopic image display devices. In addition, among the non-glasses-type stereoscopic image display devices, a stereoscopic image display device employing a time-division parallax barrier method is widely used.

In detail, according to the stereoscopic image display device employing the time-division parallax barrier method, positions of opening areas and positions of blocking areas are alternately changed in a time-division parallax barrier, and positions of pixels for outputting a left image and positions of pixels for outputting a right image are alternately changed in display panel in synchronization with operations of the time-division parallax barrier. As a result, a stereoscopic image may be implemented by alternately providing the left image and the right image to a left eye and a right eye, respectively, through the opening areas of the time-division parallax barrier.

SUMMARY

Some example embodiments provide a time-division liquid crystal barrier having a structure with an aperture ratio below 50% when alternately changing positions of opening areas and positions of blocking areas.

Some example embodiments also provide a stereoscopic image display device having the time-division liquid crystal barrier capable of improve a quality of a stereoscopic image by reducing a crosstalk between a left image and a right image.

According to some example embodiments, a time-division liquid crystal barrier may include an upper substrate having first electrodes, second electrodes, and a first insulation layer, the first insulation layer being between the first electrodes and the second electrodes, the first electrodes being arranged with a first gap, and the second electrodes being arranged with a second gap, a lower substrate having third electrodes, fourth electrodes, and a second insulation layer, the second insulation layer being between the third electrodes and the fourth electrodes, the third electrodes being arranged with the first gap, and the fourth electrodes being arranged with the second gap, and a liquid crystal layer between the upper substrate and the lower substrate, wherein the first electrodes and the second electrodes are alternately arranged with respect to the first insulation layer, the third electrodes and the fourth electrodes are alternately arranged with respect to the second insulation layer, the first electrodes overlap the third electrodes, and the second electrodes overlap the fourth electrodes.

In example embodiments, a width of each first electrode and a width of each third electrode may be greater than the first gap, and a width of each second electrode and a width of each fourth electrode may be greater than the second gap.

In example embodiments, the width of each first electrode may be the same as the width of each third electrode, and the width of each second electrode may be the same as the width of each fourth electrode.

In example embodiments, the first through fourth electrodes may correspond to transparent electrodes, and the transparent electrodes may be formed using Indium Tin Oxide (ITO) or Indium Zinc Oxide (IZO).

In example embodiments, blocking areas may be formed in the liquid crystal layer by the second electrodes and the fourth electrodes during a first time period.

In example embodiments, a predetermined voltage may be applied to the second electrodes, and a common voltage may be applied to the first electrodes, the third electrodes, and the fourth electrodes during the first time period.

In example embodiments, the blocking areas may be formed in the liquid crystal layer by the first electrodes and the third electrodes during a second time period.

In example embodiments, the predetermined voltage may be applied to the third electrodes, and the common voltage may be applied to the first electrodes, the second electrodes, and the fourth electrodes during the second time period.

In example embodiments, the predetermined voltage may be determined to control the liquid crystal layer to block light, and the common voltage may be determined to be 0V.

In example embodiments, the time-division liquid crystal barrier may further include a first polarizing plate that is placed on an upper surface of the upper substrate, and a second polarizing plate that is placed on a lower surface of the lower substrate.

According to some example embodiments, a stereoscopic image display device may include a time-division liquid crystal barrier that alternately changes positions of blocking areas and positions of opening areas based on a predetermined voltage and a common voltage, the blocking areas and the opening areas being formed in a liquid crystal layer that is placed between an upper substrate and a lower substrate, the upper substrate having first electrodes and second electrodes that are alternately arranged with respect to a first insulation layer, the lower substrate having third electrodes and fourth electrodes that are alternately arranged with respect to a second insulation layer, a display panel that alternately changes positions of pixels for outputting a left image and positions of pixels for outputting a right image when the positions of the blocking areas and the positions of the opening areas are alternately changed in the time-division liquid crystal barrier, and a peripheral circuit that controls operations of the time-division liquid crystal barrier and operations of the display panel.

In example embodiments, the first electrodes may be arranged with a first gap, the second electrodes may be arranged with a second gap, the third electrodes may be arranged with the first gap, and the fourth electrodes may be arranged with the second gap. In addition, the first electrodes may overlap the third electrodes, and the second electrodes may overlap the fourth electrodes.

In example embodiments, a width of each first electrode and a width of each third electrode may be greater than the first gap, and a width of each second electrode and a width of each fourth electrode may be greater than the second gap.

In example embodiments, the width of each first electrode may be the same as the width of each third electrode, and the width of each second electrode may be the same as the width of each fourth electrode.

In example embodiments, the blocking areas may be formed in the liquid crystal layer by the second electrodes and the fourth electrodes during a first time period.

In example embodiments, the predetermined voltage may be applied to the second electrodes, and the common voltage may be applied to the first electrodes, the third electrodes, and the fourth electrodes during the first time period.

In example embodiments, the blocking areas may be formed in the liquid crystal layer by the first electrodes and the third electrodes during a second time period.

In example embodiments, the predetermined voltage may be applied to the third electrodes, and the common voltage may be applied to the first electrodes, the second electrodes, and the fourth electrodes during the second time period.

In example embodiments, the predetermined voltage may be determined to control the liquid crystal layer to block light, and the common voltage may be determined to be 0V.

In example embodiments, a first polarizing plate placed on an upper surface of the upper substrate and a second polarizing plate placed on a lower surface of the lower substrate may be included in the time-division liquid crystal barrier.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
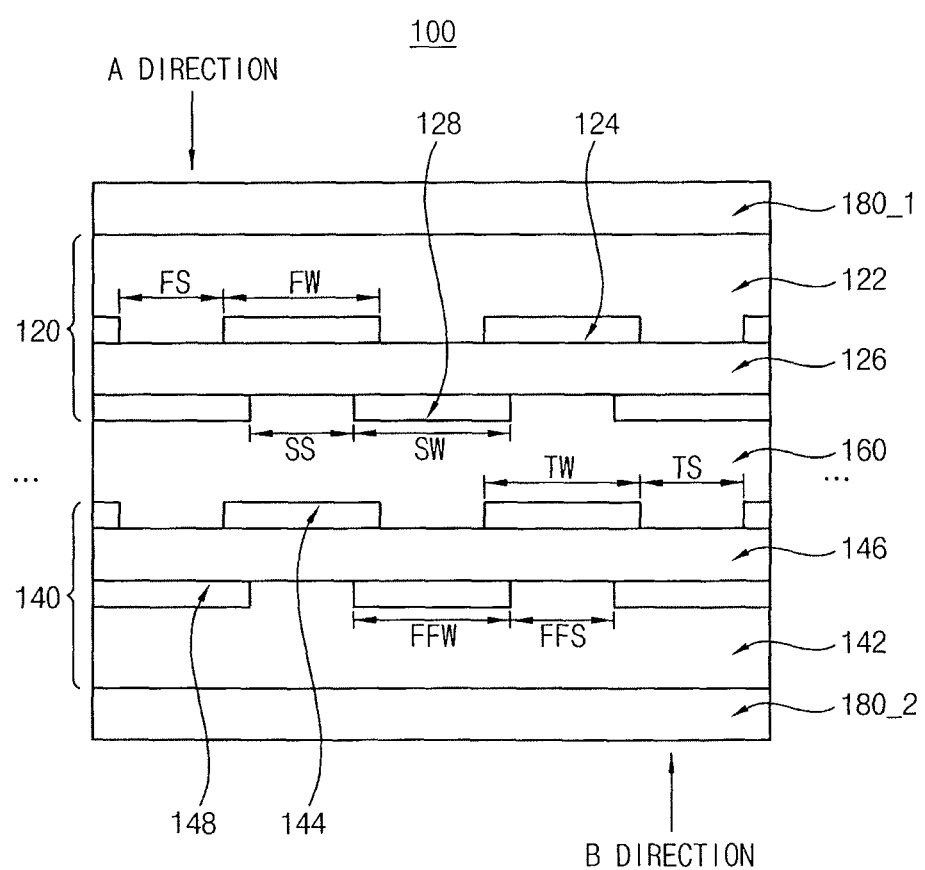
FIG. 1 is a cross-sectional view illustrating a time-division liquid crystal barrier according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating a time-division liquid crystal barrier according to example embodiments.

Referring to FIG. 1, the time-division liquid crystal barrier 100 may include an upper substrate 120, a lower substrate 140, and a liquid crystal layer 160.

The upper substrate 120 may include first electrodes 124, second electrodes 128, and a first insulation layer 126 that is placed between the first electrodes 124 and the second electrodes 128. The first electrodes 124 may be arranged with a first gap FS, e.g., one first gap FS may be between two adjacent first electrodes 124. The second electrodes 128 may be arranged with a second gap SS, e.g., one second gap SS may be between two adjacent second electrodes 128. In addition, a width FW of each first electrode 124 may be greater than the first gap FS, and a width SW of each second electrode 128 may be greater than the second gap SS. Further, the width FW of each first electrode 124 may be the same as a width TW of each third electrode 144 of the lower substrate 140, and the width SW of each second electrode 128 may be the same as a width FFW of each fourth electrode 148 of the lower substrate 140. It is noted that widths of the gaps and electrodes are measured along an X-axis direction.

The upper substrate 120 may further include a transparent substrate 122, e.g., a glass substrate. The first electrodes 124 and the second electrodes 128 may correspond to, e.g., may be, transparent electrodes. For example, the first electrodes 124 and the second electrodes 128 may be formed using Indium Tin Oxide (ITO) or Indium Zinc Oxide (IZO). In addition, the first insulation layer 126 may be formed using transparent materials, e.g., silicon dioxide ($SiO_2$), etc.

As illustrated in FIG. 1, the first electrodes 124 and the second electrodes 128 may be alternately arranged in a first direction, e.g., along the X-axis direction, in the upper substrate 120. Here, the first electrodes 124 and the second electrodes 128 may be extended in a perpendicular direction to a paper surface, i.e., the first electrodes 124 and the second electrodes 128 may be stripe-patterned. In addition, the first electrodes 124 may be aligned to positions corresponding to, e.g., overlapping, the second gap SS that exists among the second electrodes 128. Further, the second electrodes 128 may be aligned to positions corresponding to, e.g., overlapping, the first gap FS that exists among the first electrodes 124. For example, the first electrodes 124 and the second electrodes 128 may be alternately arranged with respect to the first insulation layer 126, so one first electrode 124 on a first surface of the first insulation layer 126 may be between two adjacent second electrode 128 on a second surface of the first insulation layer 126. In other words, one first electrode 124 on the first surface of the first insulation layer 126 may overlap a gap between the two adjacent second electrodes 128 on the second surface of the first insulation layer 126, i.e., the first and second surfaces of the first insulation layer 126 being opposite to each other.

In one example embodiment, the first electrodes 124 may be overlapped by the third electrodes 144 of the lower substrate 140, and the second electrodes 128 may be overlapped by the fourth electrodes 148 of the lower substrate 140. As a result, when opening areas and blocking areas are formed in the liquid crystal layer 160 that is placed between the upper substrate 120 and the lower substrate 140, the first electrodes 124 of the upper substrate 120 and the third electrodes 144 of the lower substrate 140 may operate as a pair, and the second electrodes 128 of the upper substrate 120 and the fourth electrodes 148 of the lower substrate 140 may operate as a pair.

The lower substrate 140 may include the third electrodes 144, the fourth electrodes 148, and a second insulation layer 146 that is placed between the third electrodes 144 and the fourth electrodes 148. The third electrodes 144 may be arranged with a third gap TS (i.e., the third gap TS exists among the third electrodes 144). The fourth electrodes 148 may be arranged with a fourth gap FFS (i.e., the fourth gap FFS exists among the fourth electrodes 148). In addition, the width TW of each third electrode 144 may be greater than the third gap TS, and the width FFW of each fourth electrode 148 may be greater than the fourth gap FFS. Further, the width TW of each third electrode 144 may be the same as the width FW of each first electrode 124 of the upper substrate 120, and the width FFW of each fourth electrode 148 may be the same as the width SW of each second electrode 128 of the upper substrate 120.

The lower substrate 140 may include a transparent substrate 142, e.g., a glass substrate. The third electrodes 144 and the fourth electrodes 148 may correspond to transparent electrodes. For example, the third electrodes 144 and the fourth electrodes 148 may be formed using ITO or IZO. In addition, the second insulation layer 146 may be formed using transparent materials, e.g., $SiO_2$, etc. As illustrated in FIG. 1, the third electrodes 144 and the fourth electrodes 148 may be alternately arranged in a first direction, e.g., X-axis direction, in the lower substrate 140. Here, the third electrodes 144 and the fourth electrodes 148 may be extended in a perpendicular direction to a paper surface, i.e., the third electrodes 144 and the fourth electrodes 148 may be stripe-patterned. In addition, the third electrodes 144 may be aligned to positions corresponding to the fourth gap FFS that exists among the fourth electrodes 148. Further, the fourth electrodes 148 may be aligned to positions corresponding to the third gap TS that exists among the third electrodes 144. In one example embodiment, the third electrodes 144 may be overlapped by the first electrodes 124 of the upper substrate 120, and the fourth electrodes 148 may be overlapped by the second electrodes 128 of the upper substrate 120. As a result, when opening areas and blocking areas are formed in the liquid crystal layer 160 that is placed between the upper substrate 120 and the lower substrate 140, the first electrodes 124 of the upper substrate 120 and the third electrodes 144 of the lower substrate 140 may operate as a pair, and the second electrodes 128 of the upper substrate 120 and the fourth electrodes 148 of the lower substrate 140 may operate as a pair.

In some example embodiments, the time-division liquid crystal barrier 100 may further include a first polarizing plate 180_1 that is placed on one surface (e.g., an upper surface in FIG. 1) of the upper substrate 120, and a second polarizing plate 180_2 that is placed on one surface (e.g., a lower surface in FIG. 1) of the lower substrate 140.

The liquid crystal layer 160 may be placed between the upper substrate 120 and the lower substrate 140. Although not illustrated in FIG. 1, a first alignment plate may be placed between the upper substrate 120 and the liquid crystal layer 160, and a second alignment plate may be placed between the lower substrate 140 and the liquid crystal layer 160. That is, the first alignment plate may be formed under the second electrodes 128 of the upper substrate 120, and the second alignment plate may be formed over the third electrodes 144 of the lower substrate 140. In the liquid crystal layer 160, the opening areas and the blocking areas may be formed based on changes of a molecular arrangement of the liquid crystal.

In detail, the molecular arrangement of the liquid crystal may be changed based on respective voltages that are applied to the first through fourth electrodes 124, 128, 144, and 148. As described above, the first insulation layer 126 may be placed between the first electrodes 124 and the second electrodes 128, and the first electrodes 124 and the second electrodes 128 may be alternately arranged in the upper substrate 120. In addition, the second insulation layer 146 may be placed between the third electrodes 144 and the fourth electrodes 148, and the third electrodes 144 and the fourth electrodes 148 may be alternately arranged in the lower substrate 140. Here, the first electrodes 124 of the upper substrate 120 may be overlapped by the third electrodes 144 of the lower substrate 140. In addition, the second electrodes 128 of the upper substrate 120 may be overlapped by the fourth electrodes 148 of the lower substrate 140. Thus, the blocking areas may be formed in the liquid crystal layer 160 by the second electrodes 128 of the upper substrate 120 and the fourth electrodes 148 of the lower substrate 140 during a first time period, and by the first electrodes 124 of the upper substrate 120 and the third electrodes 144 of the lower substrate 140 during a second time period.

In one example embodiment, the time-division liquid crystal barrier 100 may operate in a normally white mode, i.e., the time-division liquid crystal barrier 100 allows light to pass through in an off-state and does not allow light to pass through in an on-state. For this operation, during the first time period, a predetermined voltage may be applied to the second electrodes 128 of the upper substrate 120, and a common voltage may be applied to the first electrodes 124 of the upper substrate 120 and the third and fourth electrodes 144 and 148 of the lower substrate 140. During the second time period, the predetermined voltage may be applied to the third electrodes 144 of the lower substrate 140, and the common voltage may be applied to the first and second electrodes 124 and 128 of the upper substrate 120 and the fourth electrodes 148 of the lower substrate 140. Here, the predetermined voltage may be determined to control the liquid crystal layer 160 to block light, i.e., a voltage other than 0V, and the common voltage may be determined to be 0V.

An operation of the time-division liquid crystal barrier 100 may not be limited to a normally white mode. For example, the time-division liquid crystal barrier 100 may operate in a normally black mode, i.e., the time-division liquid crystal barrier 100 allows light to pass through in an on-state and does not allow light to pass through in an off-state. Thus, the time-division liquid crystal barrier 100 may form the block areas and the opening areas in the liquid crystal layer 160 by operating the first electrodes 124 of the upper substrate 120 and the third electrodes 144 of the lower substrate 140 as a pair, and by operating the second electrodes 128 of the upper substrate 120 and the fourth electrodes 148 of the lower substrate 140 as a pair. Thus, the first electrodes 128 may be aligned to positions corresponding to the second gap SS that exists among the second electrodes 128, and the second electrodes 128 may be aligned to positions corresponding to the first gap FS that exists among the first electrodes 124. In addition, the third electrodes 144 may be aligned to positions corresponding to the fourth gap FFS that exists among the fourth electrodes 148, and the fourth electrodes 148 may be aligned to positions corresponding to the third gap TS that exists among the third electrodes 144. Further, since widths FW, SW, TW, and FFW of the first through fourth electrodes 124, 128, 144, and 148 are greater than the first through fourth gaps FS, SS, TS, and FFS, respectively, an aperture ratio of the time-division liquid crystal barrier 100 may be reduced to below 50% when a stereoscopic image is implemented.

In conclusion, the time-division liquid crystal barrier 100 may have a structure in which the upper substrate 120 includes the first and second electrodes 124 and 128, and the lower substrate 140 includes the third and fourth electrodes 144 and 148. Here, the first electrodes 124 and the second electrodes 128 are alternately arranged in the upper substrate 120, and the third electrodes 144 and the fourth electrodes 148 are alternately arranged in the lower substrate 140. In addition, since the liquid crystal layer 160 is placed between the upper substrate 120 and the lower substrate 140, the first and second electrodes 124 and 128 may face the third and fourth electrodes 144 and 148 with respect to the liquid crystal layer 160, e.g., the first and second electrodes 124 and 128 may be symmetrical with respect to respective third and fourth electrodes 144 and 148 with respect to the liquid crystal layer 160 therebetween. Therefore, the time-division liquid crystal barrier 100 may alternately form the blocking areas and the opening areas in the liquid crystal layer 160 by operating the first electrodes 124 and the third electrodes 144 as a pair, and by operating the second electrodes 128 and the fourth electrodes 148 as a pair. As a result, an aperture ratio of the time-division liquid crystal barrier 100 may be reduced to below 50%.

In other words, the time-division liquid crystal barrier 100 may have two-layer electrode structures in the upper substrate 120 and the lower substrate 140, respectively. That is, a first two-layer electrode structure of the upper substrate 120 having the first and second electrodes 124 and 128 may be on a second two-layer electrode structure of the lower substrate 140 having the third and fourth electrodes 144 and 148. Here, a width SW of each second electrode 128 may be greater than the third gap SS, and a width TW of each third electrode 144 may be greater than the second gap SS in order to reduce an aperture ratio to below 50% when a stereoscopic image is implemented, e.g., each electrode may be wider along the x-axis direction than a gap it overlaps. Hence, when the time-division liquid crystal barrier 100 operates to implement a stereoscopic image, the blocking areas having widths SW and TW of the second and third electrodes 128 and 144 may be formed in the liquid crystal layer 160, and the opening areas having widths corresponding to the second and third gaps SS and TS may be formed in the liquid crystal layer 160. Thus, as openings areas corresponding to gaps are narrower than blocking areas corresponding to electrodes, an aperture ratio of the time-division liquid crystal barrier 100 may be reduced to below 50%. As a result, a crosstalk between a left image and a right image may be prevented when a stereoscopic image is implemented.

Figure 2:
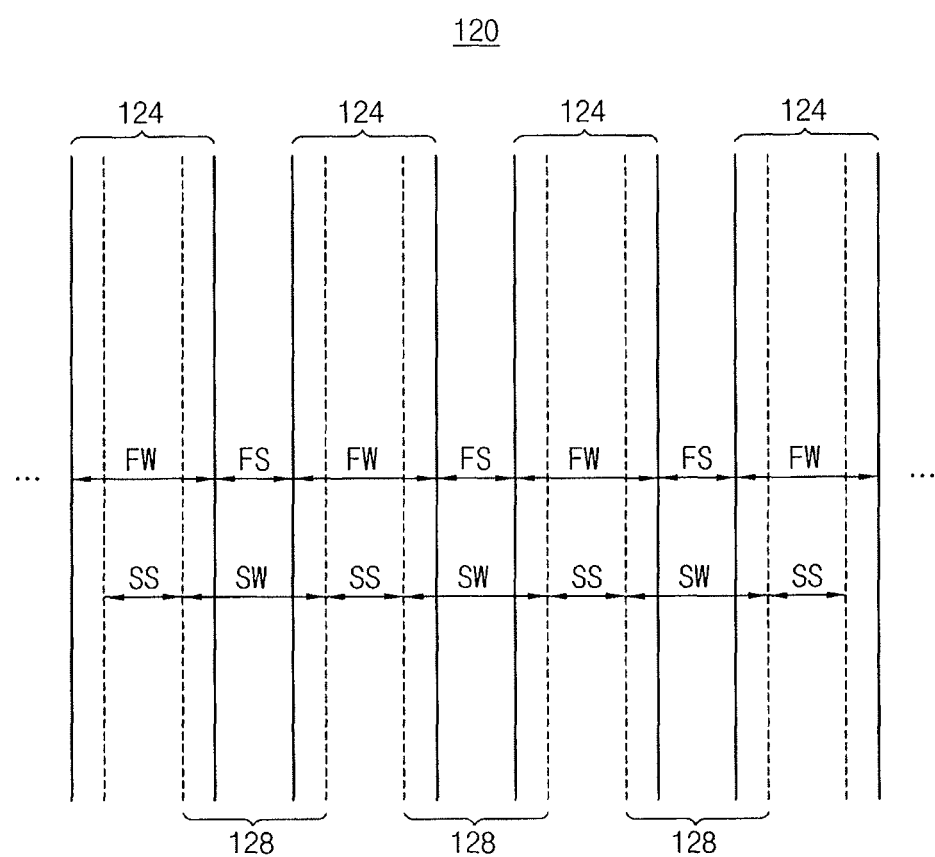
FIG. 2 is a plan view illustrating an arrangement of first and second electrodes when watching a time-division liquid crystal barrier of FIG. 1 in A-direction.

FIG. 2 is a plan view illustrating an arrangement of the first and second electrodes 124 and 128 when watching the time-division liquid crystal barrier 100 in A-direction, i.e., from top.

Referring to FIG. 2, the first electrodes 124 may be formed with the first gap FS, and the second electrodes 128 may be formed with the second gap SS. As described above, the first insulation layer 126 may be placed between the first electrodes 124 and the second electrodes 128. Here, a width FW of each first electrode 124 may be greater than the first gap FS, and a width SW of each second electrode 128 may be greater than the second gap SS. The first and second electrodes 124 and 128 of the upper substrate 120 may operate as a pair of the third and fourth electrodes 144 and 148 of the lower substrate 140, respectively. For convenience of descriptions, it will be described with respect to the first and second electrodes 124 and 128 in FIG. 2.

As illustrated in FIG. 2, the first electrodes 124 and the second electrodes 128 may be alternately arranged in a first direction (e.g., X-axis direction) in the upper substrate 120. In addition, the first electrodes 124 and the second electrodes 128 may be extended in a second direction (e.g., Y-axis direction). Namely, the first electrodes 124 and the second electrodes 128 may be stripe patterns. Here, the first electrodes 124 may be aligned to positions corresponding to the second gap SS, and the second electrodes 128 may be aligned to positions corresponding to the first gap FS. For example, during a first time period for displaying a stereoscopic image, positions corresponding to the first electrodes 124 may act as the opening areas in the liquid crystal layer 160, and positions corresponding to the second electrodes 128 may act as the blocking areas in the liquid crystal layer 160. In this case, since the positions corresponding to the second electrodes 128 act as the blocking areas, a width of each opening area may be substantially reduced to the second gap SS. Similarly, during a second time period for displaying a stereoscopic image, the positions corresponding to the first electrodes 124 may act as the blocking areas in the liquid crystal layer 160, and the positions corresponding to the second electrodes 128 may act as the opening areas in the liquid crystal layer 160. In this case, since the positions corresponding to the first electrodes 124 act as the blocking areas, a width of each opening area may be substantially reduced to the first gap FS.

In one example embodiment, a width FW of each first electrode 124 may be the same as a width SW of each second electrode 128, and the first gap FS may be the same as the second gap SS. In another example embodiment, a width FW of each first electrode 124 may be different from a width SW of each second electrode 128, and the first gap FS may be different from the second gap SS. Therefore, when the time-division liquid crystal barrier 100 operates, the opening areas may be reduced to the first gap FS or the second gap SS. As a result, an aperture of the time-division liquid crystal barrier 100 may be reduced to below 50% when a stereoscopic image is implemented because the first and second gaps FS and SS are smaller than widths FW and SW of the first and second electrodes 124 and 128.

Figure 3:
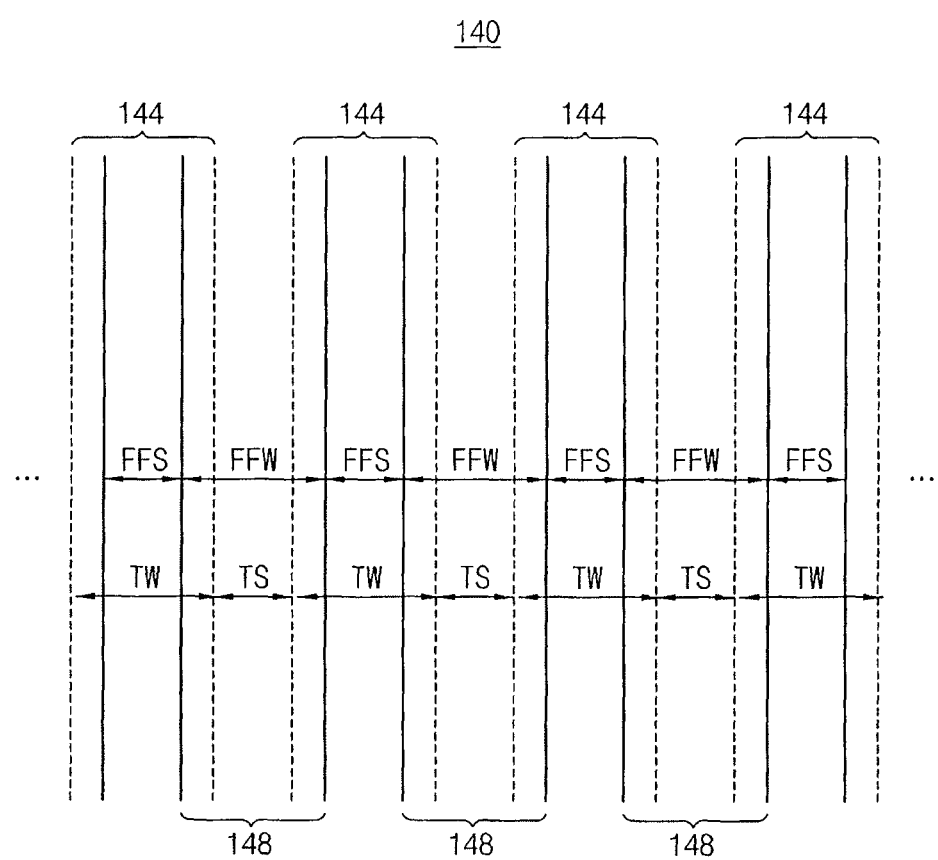
FIG. 3 is a plan view illustrating an arrangement of third and fourth electrodes when watching a time-division liquid crystal barrier of FIG. 1 in B-direction.

FIG. 3 is a plan view illustrating an arrangement of third and fourth electrodes 144 and 148 when watching the time-division liquid crystal barrier 100 in B-direction, i.e., from bottom.

Referring to FIG. 3, the third electrodes 144 may be formed with the third gap TS, and the fourth electrodes 148 may be formed with the fourth gap FFS. As described above, the second insulation layer 146 may be placed between the third electrodes 144 and the fourth electrodes 148. Here, the width TW of each third electrode 144 may be greater than the third gap TS, and the width FFW of each fourth electrode 148 may be greater than the fourth gap FFS. The third and fourth electrodes 144 and 148 of the lower substrate 140 may operate as a pair of the first and second electrodes 124 and 128 of the upper substrate 120, respectively. For convenience of descriptions, it will be described with respect to the third and fourth electrodes 144 and 148 in FIG. 3.

As illustrated in FIG. 3, the third electrodes 144 and the fourth electrodes 148 may be alternately arranged in the first direction (e.g., X-axis direction) in the lower substrate 140. In addition, the third electrodes 144 and the fourth electrodes 148 may be extended in a second direction (e.g., Y-axis direction). Namely, the third electrodes 144 and the fourth electrodes 148 may be stripe patterns. Here, the third electrodes 144 may be aligned to positions corresponding to the fourth gap FFS, and the fourth electrodes 148 may be aligned to positions corresponding to the third gap TS. For example, during a first time period for displaying a stereoscopic image, positions corresponding to the third electrodes 144 may act as the opening areas in the liquid crystal layer 160, and positions corresponding to the fourth electrodes 148 may act as the blocking areas in the liquid crystal layer 160. In this case, since the positions corresponding to the fourth electrodes 148 act as the blocking areas, a width of each opening area may be substantially reduced to the fourth gap FFS. Similarly, during a second time period for displaying a stereoscopic image, the positions corresponding to the third electrodes 144 may act as the blocking areas in the liquid crystal layer 160, and the positions corresponding to the fourth electrodes 148 may act as the opening areas in the liquid crystal layer 160. In this case, since the positions corresponding to the third electrodes 144 act as the blocking areas, a width of each opening area may be substantially reduced to the third gap TS.

In one example embodiment, the width TW of each third electrode 144 may be the same as the width FFW of each fourth electrode 148, and the third gap TS may be the same as the fourth gap FFS. In another example embodiment, the width TW of each third electrode 144 may be different from the width FFW of each fourth electrode 148, and the third gap TS may be different from the fourth gap FFS. Therefore, when the time-division liquid crystal barrier 100 operates, the opening areas may be reduced to the third gap TS or the fourth gap FFS. As a result, the aperture of the time-division liquid crystal barrier 100 may be reduced to below 50% when a stereoscopic image is implemented because the third and fourth gaps TS and FFS are smaller than widths TW and FFW of the third and fourth electrodes 144 and 148.

Figure 4A:
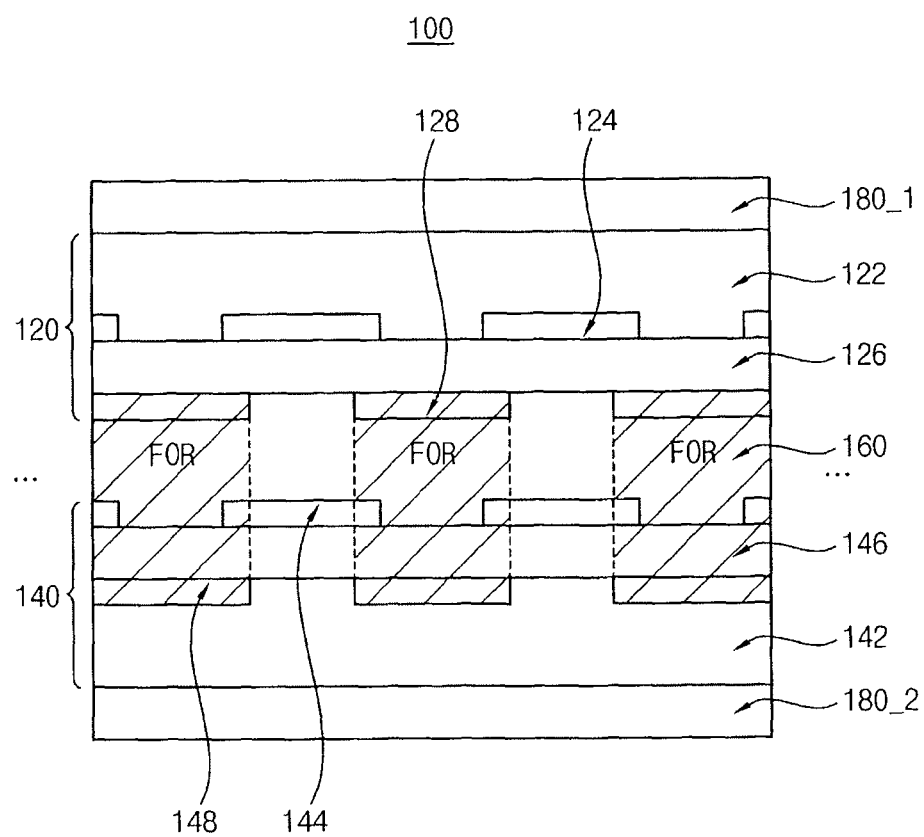
FIG. 4A is a cross-sectional view illustrating an example in which blocking areas are formed by second electrodes and fourth electrodes during a first time period in a time-division liquid crystal barrier of FIG. 1.
Figure 4B:
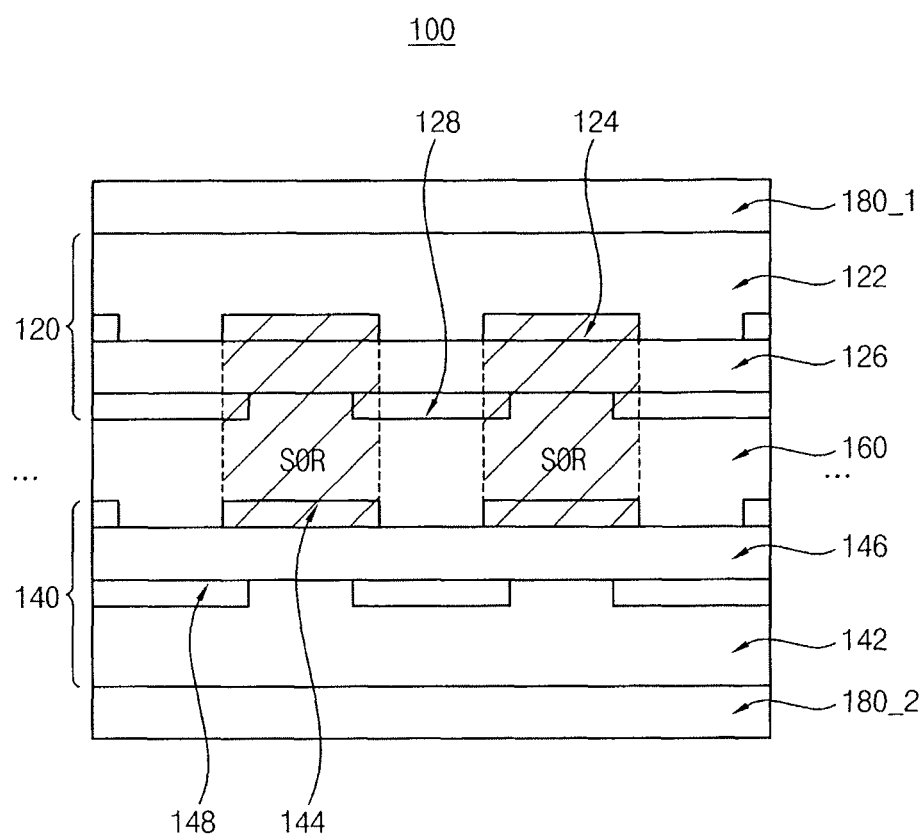
FIG. 4B is a cross-sectional view illustrating an example in which blocking areas are formed by first electrodes and third electrodes during a second time period in a time-division liquid crystal barrier of FIG. 1.
Figure 5:
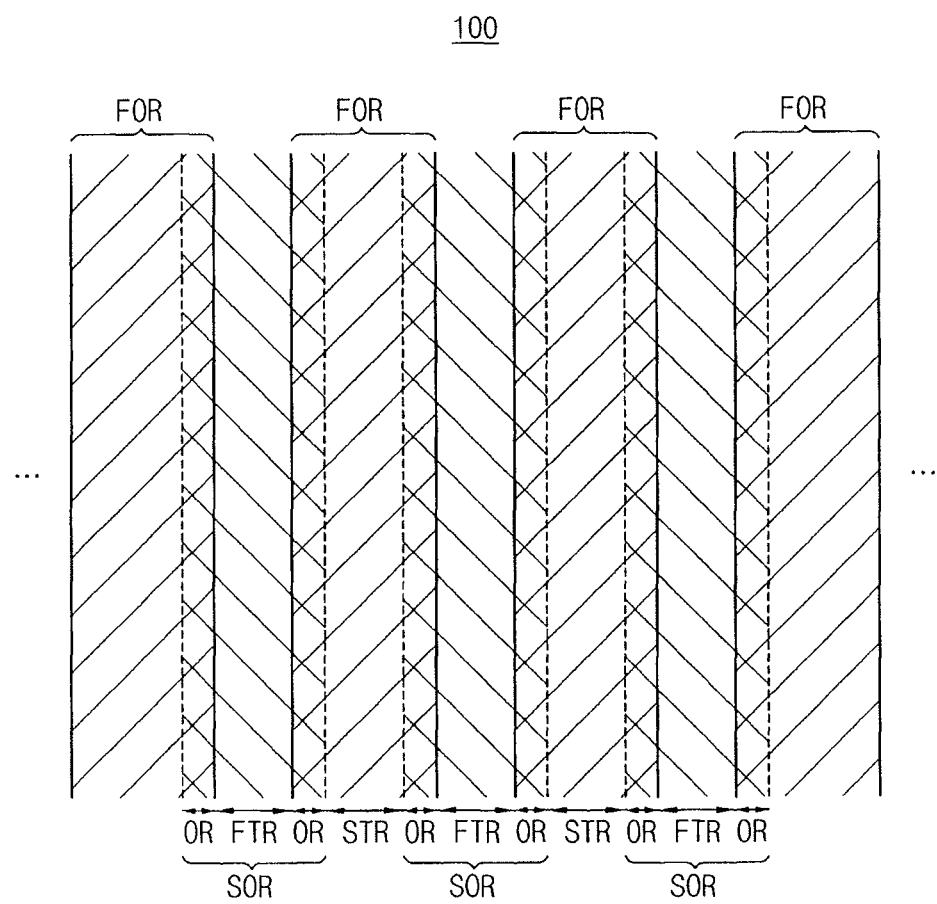
FIG. 5 is a plan view illustrating blocking areas that are alternately formed in a time-division liquid crystal barrier of FIG. 1.

FIG. 4A is a cross-sectional view illustrating an example in which blocking areas are formed by the second electrodes 128 and fourth electrodes 148 during a first time period in the time-division liquid crystal barrier 100. FIG. 4B is a cross-sectional view illustrating an example in which blocking areas are formed by the first electrodes 124 and third electrodes 144 during a second time period in the time-division liquid crystal barrier 100. FIG. 5 is a plan view illustrating blocking areas that are alternately formed in the time-division liquid crystal barrier 100.

Referring to FIGS. 4A, 4B, and 5, positions of opening areas and positions of blocking areas are alternately changed in the time-division liquid crystal barrier 100 as time goes on. In addition, positions of pixels for outputting a left image and positions of pixels for outputting a right image are alternately changed in display panel in synchronization with operations of the time-division liquid crystal barrier 100. FIG. 4A shows that the blocking areas FOR are formed by the second electrodes 128 and the fourth electrodes 148 in the time-division liquid crystal barrier 100 during the first time period for displaying a stereoscopic image. For this operation, during the first time period, a predetermined voltage, e.g., a voltage other than 0V, may be applied to the second electrodes 128 of the upper substrate 120, and a common voltage, e.g., 0V, may be applied to the first electrodes 124 of the upper substrate 120, and the third and fourth electrodes 144 and 148 of the lower substrate 140. As a result, spaces of the liquid crystal layer 160 between the second electrodes 128 and the fourth electrodes 148 may act as the blocking areas FOR. FIG. 4B shows that the blocking areas SOR are formed by the first electrodes 124 and the third electrodes 144 in the time-division liquid crystal barrier 100 during a second time period for displaying a stereoscopic image. For this operation, during the second time period, the predetermined voltage, e.g., a voltage other than 0V, may be applied to the third electrodes 144 of the lower substrate 140, and the common voltage, e.g., 0V, may be applied to the first and second electrodes 124 and 128 of the upper substrate 120, and the fourth electrodes 148 of the lower substrate 140. As a result, spaces of the liquid crystal layer 160 between the first electrodes 124 and the third electrodes 144 may act as the blocking areas SOR.

As illustrated in FIG. 5, in the time-division liquid crystal barrier 100, the blocking areas FOR that are formed by the second electrodes 128 and the fourth electrodes 148 during the first time period may overlap the blocking areas SOR that are formed by the first electrodes 124 and the third electrodes 144 during the second time period. Hence, overlapped regions OR may exist between the blocking areas FOR and the blocking areas SOR. Because of the overlapped regions OR, the time-division liquid crystal barrier 100 may have an aperture ratio of below 50%.

In detail, since the blocking areas FOR are formed by the second electrodes 128 and the fourth electrodes 148 during the first time period, a width of each opening area FTR may be a width of each first electrode 124 (i.e., a width of each third electrode 144) minus widths of the overlapped regions OR. Similarly, since the blocking areas SOR are formed by the first electrodes 124 and the third electrodes 144 during the second time period, a width of each opening area STR may be a width of each second electrode 128 (i.e., a width of each fourth electrode 148) minus widths of the overlapped regions OR. In other words, an aperture ratio of the time-division liquid crystal barrier 100 may be determined based on widths of the overlapped regions OR. Although it is illustrated in FIGS. 4A, 4B, and 5 that the overlapped regions OR are symmetrical and widths of the overlapped regions OR are uniform, the present inventive concept is not limited thereto. In addition, although it is described above that the time-division liquid crystal barrier 100 operates in a normally white mode, i.e., the time-division liquid crystal barrier 100 allows light to pass through in an off-state, and does not allow light to pass through in an on-state, the present inventive concept is not limited thereto. For example, the time-division liquid crystal barrier 100 may operate in a normally black mode, i.e., the time-division liquid crystal barrier 100 allows light to pass through in an on-state, and does not allows light to pass through in an off-state.

Figure 6:
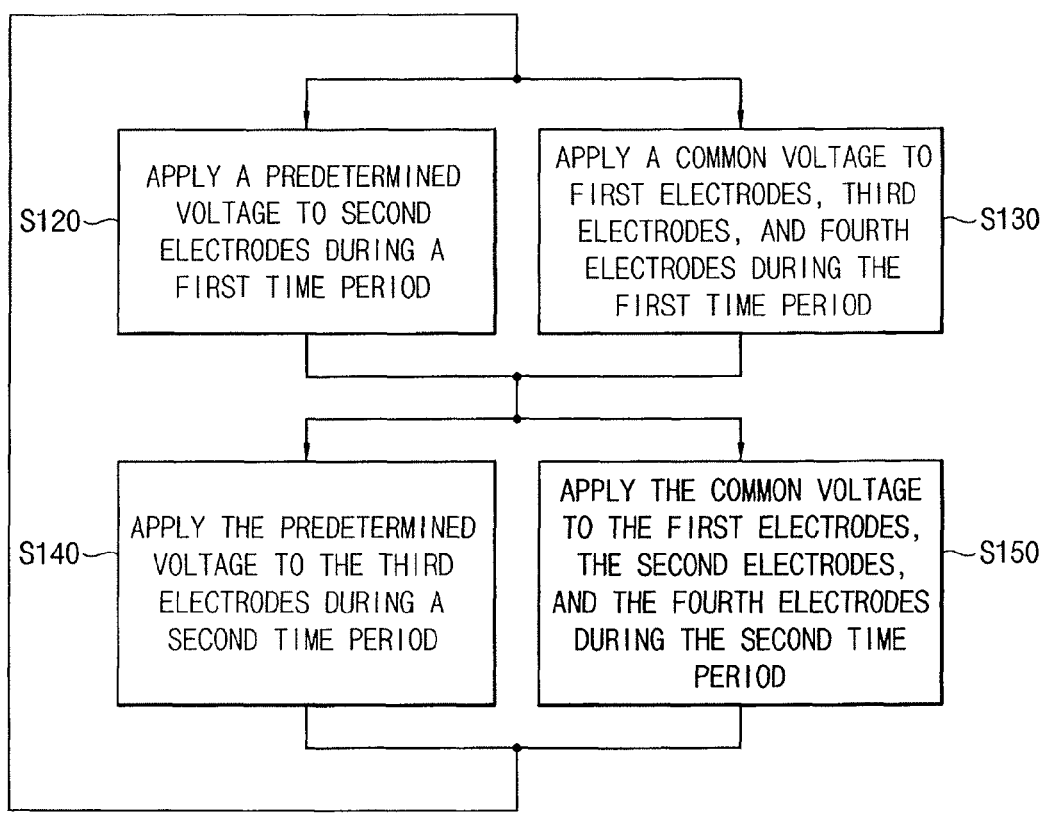
FIG. 6 is a flow chart illustrating an example in which blocking areas and opening areas are formed by applying respective voltages to first through fourth electrodes in a time-division liquid crystal barrier of FIG. 1.
Figure 7:
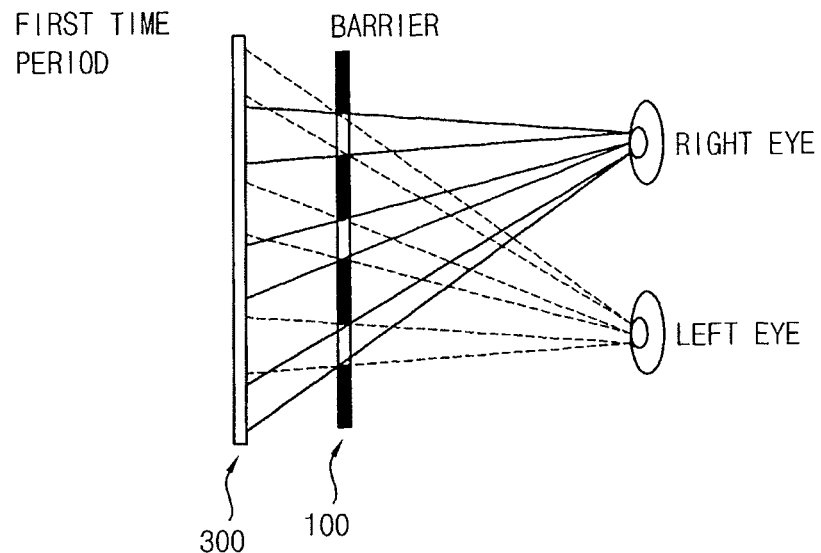
FIG. 7 is a diagram illustrating an example in which a stereoscopic image is implemented based on a time-division liquid crystal barrier of FIG. 1.
Figure 7:
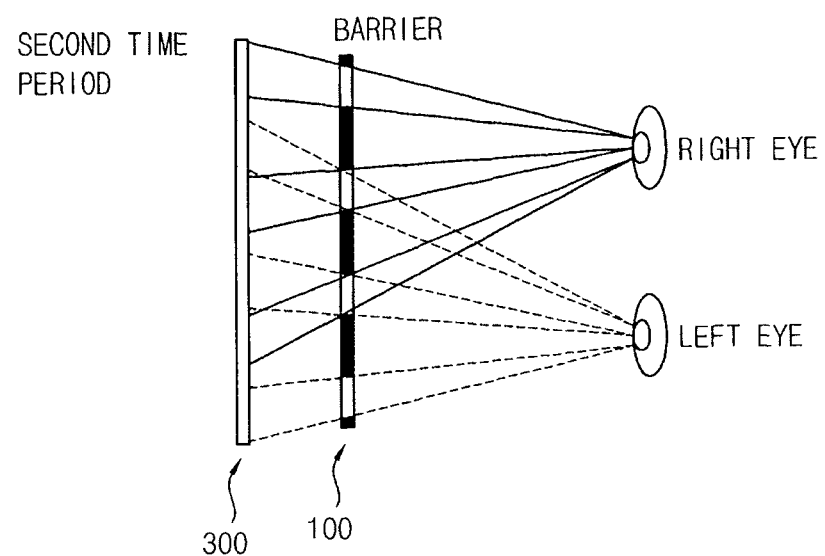

FIG. 6 is a flow chart illustrating an example in which blocking areas and opening areas are formed by applying respective voltages to first through fourth electrodes in the time-division liquid crystal barrier 100. FIG. 7 is a diagram illustrating an example in which a stereoscopic image is implemented based on the time-division liquid crystal barrier 100.

Referring to FIG. 6, in the time-division liquid crystal barrier 100 of FIG. 1, a predetermined voltage, e.g., a voltage other than 0V, may be applied to the second electrodes 128 of the upper substrate 120 during a first time period for displaying a stereoscopic image (operation S120). At the same time, a common voltage, e.g., 0V, may be applied to the first electrodes 124 of the upper substrate 120, and the third and fourth electrodes 144 and 148 of the lower substrate 140 during the first time period (operation S130). As a result, in the liquid crystal layer 160 of the time-division liquid crystal barrier 100 of FIG. 1, spaces between the first electrodes 124 of the upper substrate 120 and the third electrodes 144 of the lower substrate 140 may act as the blocking areas, and spaces operation the spaces between the first electrodes 124 of the upper substrate 120 and the third electrodes 144 of the lower substrate 140 may act as the opening areas. Next, in the time-division liquid crystal barrier 100 of FIG. 1, the predetermined voltage, e.g., a voltage other than 0V, may be applied to the third electrodes 144 of the lower substrate 140 during a second time period for displaying a stereoscopic image (operation S140). At the same time, i.e., simultaneously, the common voltage, e.g., 0V, may be applied to the first and second electrodes 124 and 128 of the upper substrate 120, and the fourth electrodes 148 of the lower substrate 140 during the second time period (operation S150). As a result, in the liquid crystal layer 160 of the time-division liquid crystal barrier 100 of FIG. 1, spaces between the second electrodes 128 of the upper substrate 120 and the fourth electrodes 148 of the lower substrate 140 may act as the blocking areas, and spaces other than the spaces between the second electrodes 128 of the upper substrate 120 and the fourth electrodes 148 of the lower substrate 140 may act as the opening areas.

As described above, since a stereoscopic image is implemented by alternately providing a left image and a right image to a left eye and a right eye, respectively. Thus, the time-division liquid crystal barrier 100 of FIG. 1 may provide a left image (or, a right image) to a left eye (or, a right eye) through the opening areas of the liquid crystal layer 160 during the first time period, and may provide a right image (or, a left image) to a right eye (or, a left eye) through the opening areas of the liquid crystal layer 160 during the second time period. As illustrated in FIG. 7, positions of the opening areas and positions of the blocking areas are alternately changed in the time-division liquid crystal barrier 100. In addition, positions of pixels for outputting a left image and positions of pixels for outputting a right image are alternately changed in a display panel 300 in synchronization with operations of the time-division liquid crystal barrier 100. Here, a sum of the first time period and the second time period may correspond to one frame, and one frame has a short time so that a viewer may not recognize a flicker. For example, the first time period may be $\frac{1}{120}$ sec, the second time period may be $\frac{1}{120}$ sec, and one frame may be $\frac{1}{60}$ sec. In some example embodiments, a blanking time period may be inserted between the first time period and the second time period to efficiently prevent a crosstalk between a left image and a right image.

Figure 8:
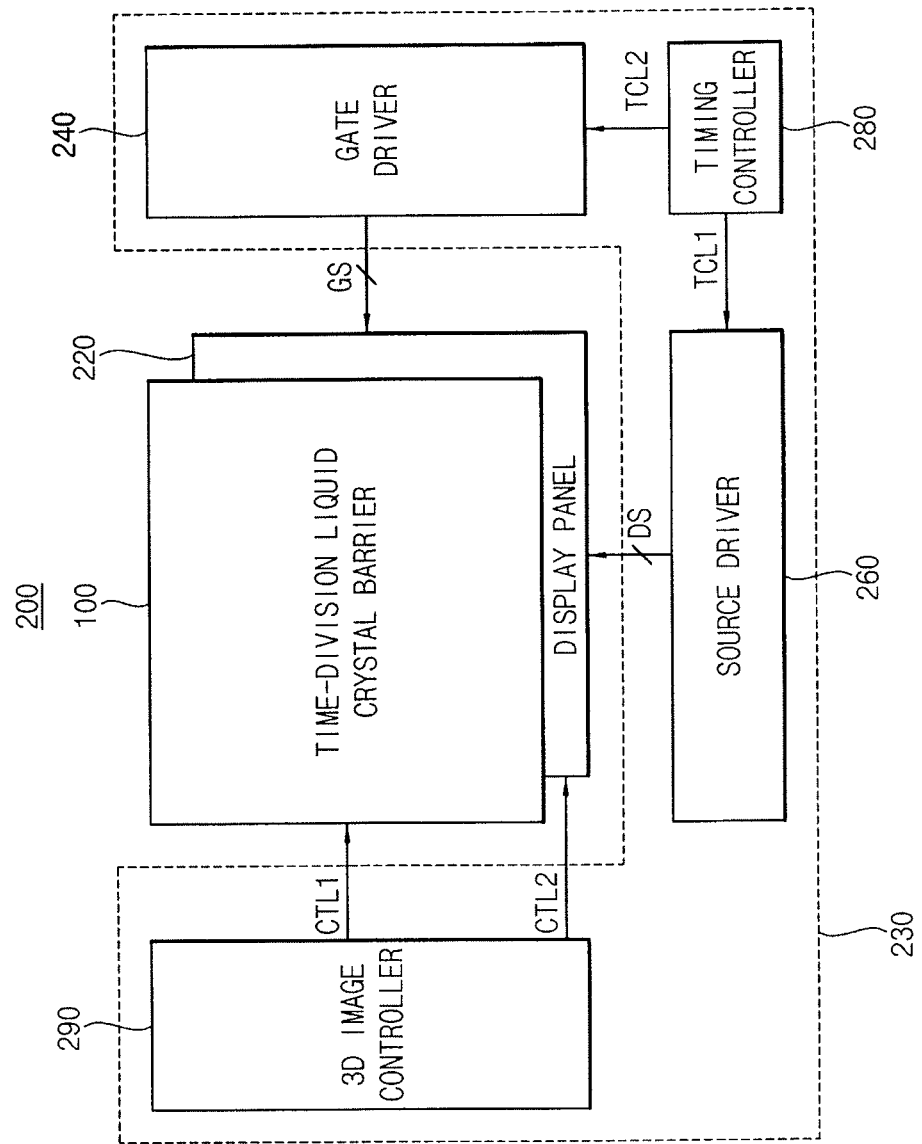
FIG. 8 is a block diagram illustrating a stereoscopic image display device according to example embodiments.
Figure 9:
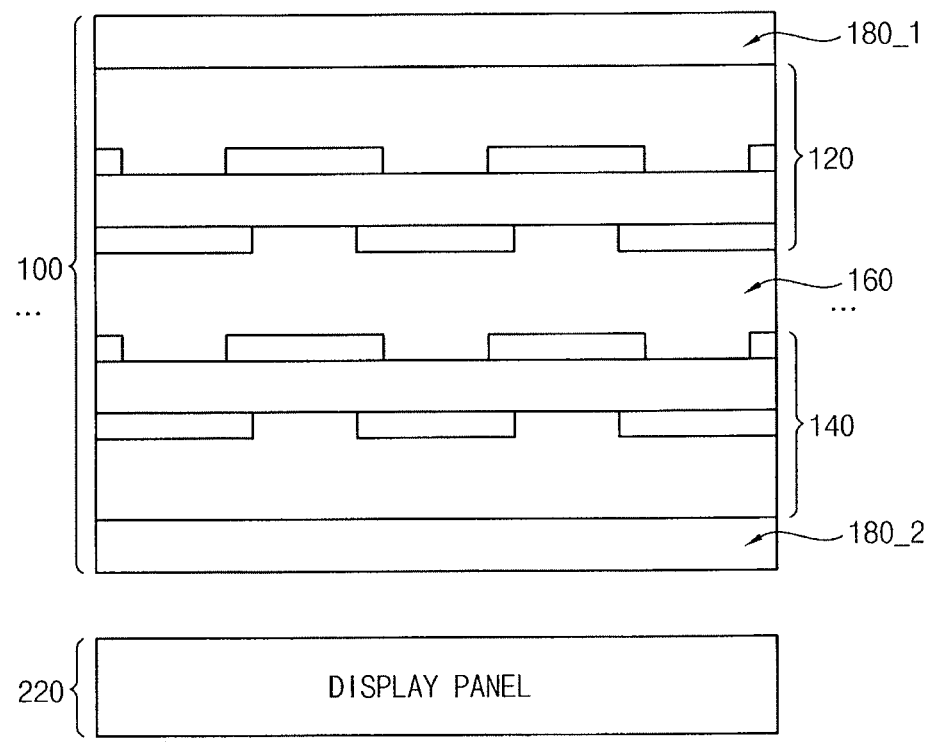
FIG. 9 is a cross-sectional view illustrating a structure having a display panel and a time-division liquid crystal barrier in a stereoscopic image display device of FIG. 8.

FIG. 8 is a block diagram illustrating a stereoscopic image display device according to example embodiments. FIG. 9 is a cross-sectional view illustrating a schematic structure of a display panel and a time-division liquid crystal barrier in the stereoscopic image display device of FIG. 8.

Referring to FIGS. 8 and 9, a stereoscopic image display device 200 may include the time-division liquid crystal barrier 100, a display panel 220, and a peripheral circuit 230. Here, the peripheral circuit 230 may include a gate driver 240, a source driver 260, a timing controller 280, a stereoscopic (3D) image controller 290, etc.

The time-division liquid crystal barrier 100 in FIGS. 8-9 may be the time-division liquid crystal barrier 100 described previously with reference to FIGS. 1-3. In particular, the time-division liquid crystal barrier 100 may include an upper substrate in which a first insulation layer is placed between the first electrodes and the second electrodes, the first electrodes and the second electrodes being alternately arranged with respect to the first insulation layer, and a lower substrate in which a second insulation layer is placed between the third electrodes and the fourth electrodes, the third electrodes and the fourth electrodes being alternately arranged with respect to the second insulation layer. Here, the time-division liquid crystal barrier 100 may alternately change positions of opening areas and positions of blocking areas based on respective voltages, i.e., a predetermined voltage and a common voltage, that are applied to the first through fourth electrodes, the opening areas and the blocking areas being formed in a liquid crystal layer that is placed between the upper substrate and the lower substrate. In the upper substrate, the first electrodes may be arranged with a first gap, and the second electrodes may be arranged with a second gap. Here, a width of each first electrode may be greater than the first gap, and a width of each second electrode may be greater than the second gap. In the lower substrate, the third electrodes may be arranged with the first gap, and the fourth electrodes may be arranged with the second gap. Here, a width of each third electrode may be greater than the first gap, and a width of each fourth electrode may be greater than the second gap. Since the first electrodes of the upper substrate overlap the third electrodes of the lower substrate, the first electrodes of the upper substrate and the third electrodes of the lower substrate may operate as a pair. Since the second electrodes of the upper substrate overlaps the fourth electrodes of the lower substrate, the second electrodes of the upper substrate and the fourth electrodes of the lower substrate may operate as a pair.

In one example embodiment, a width of each first electrode may be the same as a width of each third electrode, and a width of each second electrode may be the same as a width of each fourth electrode. In another example embodiment, a width of each first electrode may be different from a width of each third electrode, and a width of each second electrode may be different from a width of each fourth electrode. In detail, the blocking areas may be formed in the liquid crystal layer by the second electrodes and the fourth electrodes during a first time period for displaying a stereoscopic image when the predetermined voltage is applied to the second electrodes, and the common voltage is applied to the first electrodes, the third electrodes, and the fourth electrodes. Similarly, the blocking areas may be formed in the liquid crystal layer by the first electrodes and the third electrodes during a second time period for displaying a stereoscopic image when the predetermined voltage is applied to the third electrodes, and the common voltage is applied to the first electrodes, the second electrodes, and the fourth electrodes. In example embodiments, the predetermined voltage may be determined to control the liquid crystal layer to block light, i.e., a voltage other than 0V, and the common voltage may be determined to be 0V.

The display panel 220 may alternately change positions of pixels for outputting a left image and positions of pixels for outputting a right image in synchronization with operations of the time-division liquid crystal barrier 100 (i.e., as the opening areas and the blocking areas are alternately changed in the time-division liquid crystal barrier 100). As a result, the stereoscopic image display device 200 may provide a left image (or, a right image) to a left eye (or, a right eye) through the opening areas of the liquid crystal layer during the first time period, and may provide a right image (or, a left image) to a right eye (or, a left eye) through the opening areas of the liquid crystal layer during the second time period. Thus, a viewer may recognize a stereoscopic image. Since conventional time-division liquid crystal barrier substantially has an aperture ratio of above 50%, a crosstalk between a left image and a right image may be caused when a left image and a right image are provided to a left eye and a right eye, respectively. However, the time-division liquid crystal barrier 100 may reduce an aperture ratio to below 50% by having a structure in which the first and second electrodes are formed in an upper substrate, and the third and fourth electrodes are formed in a lower substrate, and by operating the first electrodes and the third electrodes as a pair and operating the second electrodes and the fourth electrodes as a pair. As a result, a crosstalk between a left image and a right image is prevented so that an image quality of a stereoscopic image may be improved.

The peripheral circuit 230 may control operations of the time-division liquid crystal barrier 100 and operation of the display panel 220. The gate driver 240 may provide a gate signal GS to the display panel 220. The source driver 260 may provide a data signal DS to the display panel 220. The timing controller 280 may provide control signals TCL1 and TCL2 to the gate driver 240 and the source driver 260. The stereoscopic image controller 290 may control the operations of display panel 220 by providing a control signal CTL2 to the display panel 220. In addition, the stereoscopic image controller 290 may control the operations of the time-division liquid crystal barrier 100 by providing a control signal CTL1 to the time-division liquid crystal barrier 100. It should be understood that a structure of the peripheral circuit 230 is simplified for convenience of descriptions. Thus, the peripheral circuit 230 may further include additional components such as a gradation voltage generator according to types of the display panel 220. For example, the display panel 220 may correspond to a Cathode Ray Tube (CRT) panel, a liquid crystal display (LCD) panel, an organic light emitting display (OLED) panel, etc.

Figure 10:
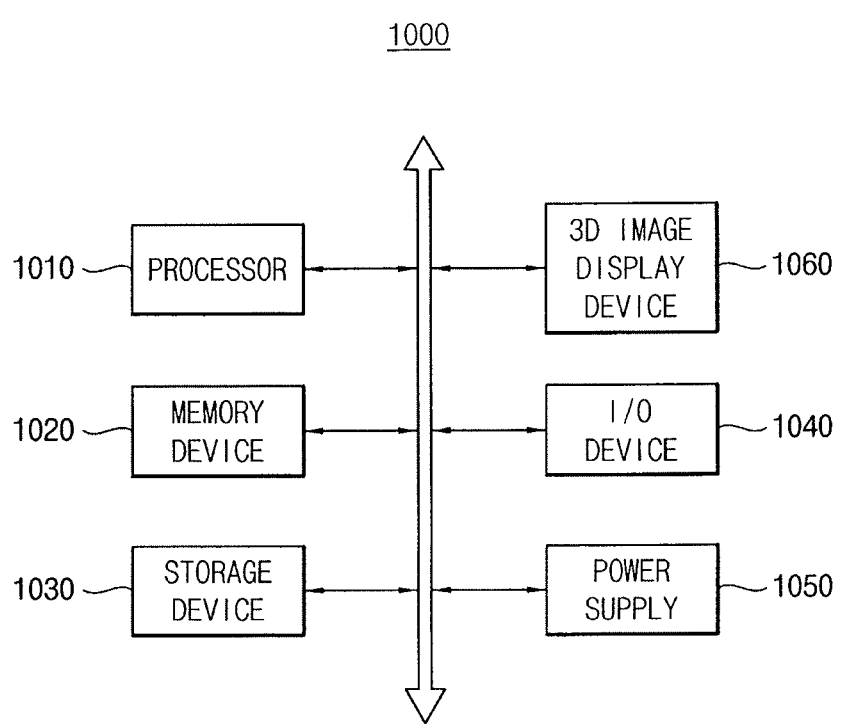
FIG. 10 is a block diagram illustrating an electric device having a stereoscopic image display device of FIG. 8.

FIG. 10 is a block diagram illustrating an electric device having a stereoscopic image display device of FIG. 8.

Referring to FIG. 10, an electric device 1000 may include a processor 1010, a memory device 1020, a storage device 1030, an input/output (I/O) device 1040, a power supply 1050, and a stereoscopic image display device 1060. Here, the stereoscopic image display device 1060 may correspond to the stereoscopic image display device 200 of FIG. 8. In addition, the electric device 1000 may further include a plurality of ports for communicating a video card, a sound card, a memory card, a universal serial bus (USB) device, other electric devices, etc.

The processor 1010 may perform various computing functions. The processor 1010 may be, e.g., a micro processor, a central processing unit (CPU), etc. The processor 1010 may be coupled to other components via, e.g., an address bus, a control bus, a data bus, etc. Further, the processor 1010 may be coupled to an extended bus such as a peripheral component interconnection (PCI) bus.

The memory device 1020 may store data for operations of the electric device 1000. For example, the memory device 1020 may include at least one non-volatile memory device, e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device, e.g., a dynamic random access memory (DRAM) device, a static random access memory (SRAM) device, a mobile dynamic random access memory (mobile DRAM) device, etc.

The storage device 1030 may be, e.g., a solid state drive (SSD) device, a hard disk drive (HDD) device, a CD-ROM device, etc.

The I/O device 1040 may be an input device, e.g., a keyboard, a keypad, a mouse, a touch screen, etc, and an output device, e.g., a printer, a speaker, etc. In some example embodiments, the stereoscopic image display device 1060 may be included as the output device in the I/O device 1040.

The power supply 1050 may provide a power for operations of the electric device 1000.

The stereoscopic image display device 1060 may communicate with other components via the buses or other communication links. As described above, the stereoscopic image display device 1060 may implement a stereoscopic image by alternately providing a left image and a right image to a left eye and a right eye, respectively using a time-division liquid crystal barrier. Here, the time-division liquid crystal barrier may reduce an aperture ratio to below 50% by having a structure in which first and second electrodes are formed in an upper substrate, and third and fourth electrodes are formed in a lower substrate, and by operating the first electrodes and the third electrodes as a pair and operating the second electrodes and the fourth electrodes as a pair. In detail, the first electrodes may be arranged with a first gap. The second electrodes may be arranged with a second gap. A first insulation layer may be placed between the first electrodes and the second electrodes. In addition, the third electrodes may be arranged with the first gap. The fourth electrodes may be arranged with the second gap. A second insulation layer may be placed between the third electrodes and the fourth electrodes. Further, the first electrodes may overlap the third electrodes, and the second electrodes may overlap the fourth electrodes. Since the time-division liquid crystal barrier is described above, duplicated descriptions will be omitted.

The present inventive concept may be applied to an electric device having a stereoscopic image display device. For example, the present inventive concept may be applied to a television, a computer monitor, a laptop, a digital camera, a cellular phone, a smart phone, a personal digital assistant (PDA), a portable multimedia player (PMP), a MP3 player, a navigation system, a video phone, etc.

A time-division liquid crystal barrier according to example embodiments may reduce an aperture ratio to below 50% by having a structure in which first electrodes and second electrodes are formed in an upper substrate, and third electrodes and fourth electrodes are formed in a lower substrate, and by operating the first electrodes and the third electrodes as a pair and operating the second electrodes and the fourth electrodes as a pair. In addition, a stereoscopic image display device having the time-division liquid crystal barrier according to example embodiments may reduce a crosstalk between a left image and a right image when implementing a stereoscopic image based on the left image and the right image. As a result, a quality of the stereoscopic image may be improved.

In contrast, a conventional time-division parallax barrier may have a structure in which first and second electrodes that are adjacent to a liquid crystal layer, i.e., the liquid crystal layer is placed between the first electrodes and the second electrodes, are symmetrically arranged with respect to the liquid crystal layer. In addition, a gap exists among the electrodes, i.e., among the first electrodes and among the second electrodes, and the opening areas and the blocking areas may be formed when respective voltages are applied to the first electrodes and the second electrodes. However, since the conventional time-division parallax barrier has a gap among the electrodes, light may escape through the gap. As a result, an aperture ratio may be greater than, i.e., may exceed, 50%, such that a quality of the stereoscopic image may decrease.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A time-division liquid crystal barrier, comprising:
an upper substrate having first electrodes, second electrodes, and a first insulation layer, the first insulation layer being between the first electrodes and the second electrodes, the first electrodes being arranged with a first gap, and the second electrodes being arranged with a second gap;
a lower substrate having third electrodes, fourth electrodes, and a second insulation layer, the second insulation layer being between the third electrodes and the fourth electrodes, the third electrodes being arranged with the first gap, and the fourth electrodes being arranged with the second gap; and
a liquid crystal layer between the upper substrate and the lower substrate,
wherein the first electrodes and the second electrodes are alternately arranged with respect to the first insulation layer, the third electrodes and the fourth electrodes are alternately arranged with respect to the second insulation layer, the first electrodes overlap the third electrodes, and the second electrodes overlap the fourth electrodes.

2. The time-division liquid crystal barrier of claim 1, wherein a width of each first electrode and a width of each third electrode is greater than the first gap, and a width of each second electrode and a width of each fourth electrode is greater than the second gap.

3. The time-division liquid crystal barrier of claim 2, wherein the width of each first electrode is the same as the width of each third electrode, and the width of each second electrode is the same as the width of each fourth electrode.

4. The time-division liquid crystal barrier of claim 3, wherein the first through fourth electrodes are transparent electrodes, each transparent electrode including at least one of Indium Tin Oxide (ITO) and Indium Zinc Oxide (IZO).

5. The time-division liquid crystal barrier of claim 4, wherein the second electrodes and the fourth electrodes define blocking areas in the liquid crystal layer during a first time period.

6. The time-division liquid crystal barrier of claim 5, wherein a predetermined voltage is applied to the second electrodes, and a common voltage is applied to the first electrodes, the third electrodes, and the fourth electrodes during the first time period.

7. The time-division liquid crystal barrier of claim 6, wherein the first electrodes and the third electrodes define the blocking areas in the liquid crystal layer during a second time period.

8. The time-division liquid crystal barrier of claim 7, wherein the predetermined voltage is applied to the third electrodes, and the common voltage is applied to the first electrodes, the second electrodes, and the fourth electrodes during the second time period.

9. The time-division liquid crystal barrier of claim 8, wherein the predetermined voltage is configured to control the liquid crystal layer to block light, and the common voltage is 0V.

10. The time-division liquid crystal barrier of claim 1, further comprising:
a first polarizing plate on an upper surface of the upper substrate; and
a second polarizing plate on a lower surface of the lower substrate.

11. A stereoscopic image display device, comprising:
a time-division liquid crystal barrier configured to alternately change positions of blocking areas and positions of opening areas in accordance with a predetermined voltage and a common voltage, the blocking areas and the opening areas being defined in a liquid crystal layer between an upper substrate and a lower substrate, the upper substrate having first electrodes and second electrodes that are alternately arranged with respect to a first insulation layer, and the lower substrate having third electrodes with gaps therebetween and fourth electrodes with gaps therebetween that are alternately arranged with respect to a second insulation layer such that the third electrodes completely overlap the gaps between the fourth electrodes and the fourth electrodes completely overlap the gaps between the third electrodes;

a display panel configured to alternately change positions of pixels for outputting a left image and positions of pixels for outputting a right image when the positions of the blocking areas and the positions of the opening areas are alternately changed in the time-division liquid crystal barrier; and a peripheral circuit configured to control operations of the time-division liquid crystal barrier and operations of the display panel.

12. The display device of claim 11, wherein:
the first electrodes are arranged with a first gap, the second electrodes are arranged with a second gap, the third electrodes are arranged with the first gap, and the fourth electrodes are arranged with the second gap, and
the first electrodes overlap the third electrodes, and the second electrodes overlap the fourth electrodes.

13. The display device of claim 12, wherein a width of each first electrode and a width of each third electrode is greater than the first gap, and a width of each second electrode and a width of each fourth electrode is greater than the second gap.

14. The display device of claim 13, wherein the width of each first electrode is the same as the width of each third electrode, and the width of each second electrode is the same as the width of each fourth electrode.

15. The display device of claim 14, wherein the blocking areas are defined in the liquid crystal layer by the second electrodes and the fourth electrodes during a first time period.

16. The display device of claim 15, wherein the predetermined voltage is applied to the second electrodes, and the common voltage is applied to the first electrodes, the third electrodes, and the fourth electrodes during the first time period.

17. The display device of claim 16, wherein the blocking areas are formed in the liquid crystal layer by the first electrodes and the third electrodes during a second time period.

18. The display device of claim 17, wherein the predetermined voltage is applied to the third electrodes, and the common voltage is applied to the first electrodes, the second electrodes, and the fourth electrodes during the second time period.

19. The display device of claim 18, wherein the predetermined voltage controls the liquid crystal layer to block light, and the common voltage is 0V.

20. The display device of claim 11, wherein the time-division liquid crystal barrier further comprises a first polarizing plate on an upper surface of the upper substrate and a second polarizing plate on a lower surface of the lower substrate.

* * * * *